United States Patent
Okafuji et al.

(10) Patent No.: US 7,593,177 B2
(45) Date of Patent: *Sep. 22, 2009

(54) RECORDING/REPRODUCING METHOD OF MAGNETIC TAPE

(75) Inventors: Masao Okafuji, Ibaraki (JP); Tsugihiro Doi, Ibaraki (JP); Tetsutaro Inoue, Ibaraki (JP); Hiroyuki Mitsuhashi, Ibaraki (JP); Seigi Kawarai, Ibaraki (JP); Sadamu Kuse, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 116 days.

This patent is subject to a terminal disclaimer.

(21) Appl. No.: 11/771,615

(22) Filed: Jun. 29, 2007

(65) Prior Publication Data

US 2007/0285832 A1    Dec. 13, 2007

Related U.S. Application Data

(62) Division of application No. 11/562,756, filed on Nov. 22, 2006, now Pat. No. 7,253,988, which is a division of application No. 11/129,400, filed on May 16, 2005, now Pat. No. 7,170,709.

(30) Foreign Application Priority Data

May 17, 2004    (JP)    .......................... P2004-147049

(51) Int. Cl.
*G11B 5/09*    (2006.01)
*G11B 5/584*    (2006.01)

(52) U.S. Cl. ..................................... 360/48; 360/77.12

(58) Field of Classification Search .................. None
See application file for complete search history.

(56) References Cited

U.S. PATENT DOCUMENTS

| 5,488,525 | A | 1/1996 | Adams et al. |
| 6,222,698 | B1 | 4/2001 | Barndt et al. |
| 7,154,691 | B2 | 12/2006 | Girvin et al. |
| 7,253,988 | B2 | 8/2007 | Okafuji et al. |
| 2005/0117246 | A1 | 6/2005 | Sueki et al. |

FOREIGN PATENT DOCUMENTS

| JP | 2002-157722 A | 5/2002 |
| JP | 2003-173508 A | 6/2003 |

*Primary Examiner*—Andrew L Sniezek
(74) *Attorney, Agent, or Firm*—Birch, Stewart, Kolasch & Birch, LLP (57) ABSTRACT

In a recording/reproducing method of a magnetic tape in a tracking servo system, a recording density of each data track is increased while inhibiting occurrence of a recording/reproducing error caused by a size change of a magnetic tape in the width direction. Data tracks are each set to have a smaller track width stepwise as closer to servo tracks (41T-1 to 41T-5 etc.) in the width direction of a magnetic tape 1. With such a setting, the width of the data tracks (A1-41T-1 to A1-41T-5 etc.) closest to the servo tracks (41T-1 to 41T-5) can be minimized, thereby enabling a significant increase in number of the data tracks. Further, even when the size of the magnetic tape 1 changes in the width direction due to a change in external environment such as a temperature or moisture, to lead to large displacement of the data tracks (A8-41T-1 to A8-41T-5) distant from the servo tracks (41T-1 to 41T-5), the data head (A8) can be readily aligned to face the data tracks (A8-41T-1 to A8-41T-5) in the reproduction by an increased portion of the width size of the data tracks (A8-41T-1 to A8-41T-5), and it is thereby possible to ensure reading of data signals from the data tracks (A8-41T-1 to A8-41T-5) so as to improve reproduction accuracy.

2 Claims, 5 Drawing Sheets

RECORDING/REPRODUCING METHOD OF MAGNETIC TAPE

This application is a Divisional of application Ser. No. 11/562,756, filed on Nov. 22, 2006, now U.S. Pat. No. 7,253,988, which is a Divisional of application Ser. No. 11/129,400, filed on May 16, 2005, now U.S. Pat. No. 7,170,709, the entire contents of which are hereby incorporated by reference and for which priority is claimed under 35 U.S.C. § 120.

BACKGROUND OF THE INVENTION

1. Field of the Invention

The present invention relates to a recording/reproducing method of a magnetic tape in a tracking servo system, using a multi-channel type head unit comprising a plurality of data heads for recording/reproduction.

2. Description of the Related Art

There are a variety of uses of a magnetic tape, including uses as an audio tape, a video tape and a computer tape. Particularly in the field of computer data backup tapes, a recording capacity has been increased with increase in capacity of a hard disc as a backup target. One of means for increasing the capacity of a magnetic tape is narrowing the width of each data track to increase the number of the data tracks, the so-called increase in recording density of data tracks.

In increasing a recording density of data tracks, it is essential to introduce a recording/reproducing technique named a so-called tracking servo system. The tracking servo system here refers to a technique in which servo tracks consisting of servo signals previously written on a magnetic tape are read with servo heads provided on a head unit, and in response to the read signals, the positional shift of the head unit in the width direction of the magnetic tape is controlled, to allow data heads to follow corresponding data tracks. According to this tacking servo system, even when the magnetic tape vibrates in the width direction in recording/reproduction to lead to displacement of the data tracks, the vibration of the magnetic tape is detected from changes in signals of the servo heads which are tracing signals from the servo tracks, and according to these changes, recording heads can be led onto the data tracks, thereby enabling significant improvement in recording/reproduction accuracy.

Conventional examples of such a tracking servo system are described in Japanese Laid-Open Patent Publication No. 2002-157722, Japanese Laid-Open Patent Publication No. 2003-173508, and the like. In Japanese Laid-Open Patent Publication No. 2002-157722, in addition to normal servo heads, pre-reading servo heads are provided for reading positional information of servo tracks prior to reading by the normal servo heads so that tracking servo accuracy can be improved, In Japanese Laid-Open Patent Publication No. 2003-173508, a servo signal for fine movement written in each data track on a magnetic tape is read with a magnetic head, and based upon the read signal, an actuator for fine movement built in each magnetic head is driven to control fine movements of a recording head and a reproducing head individually, so that tracking servo accuracy can be improved.

SUMMARY OF THE INVENTION

Figure 1:
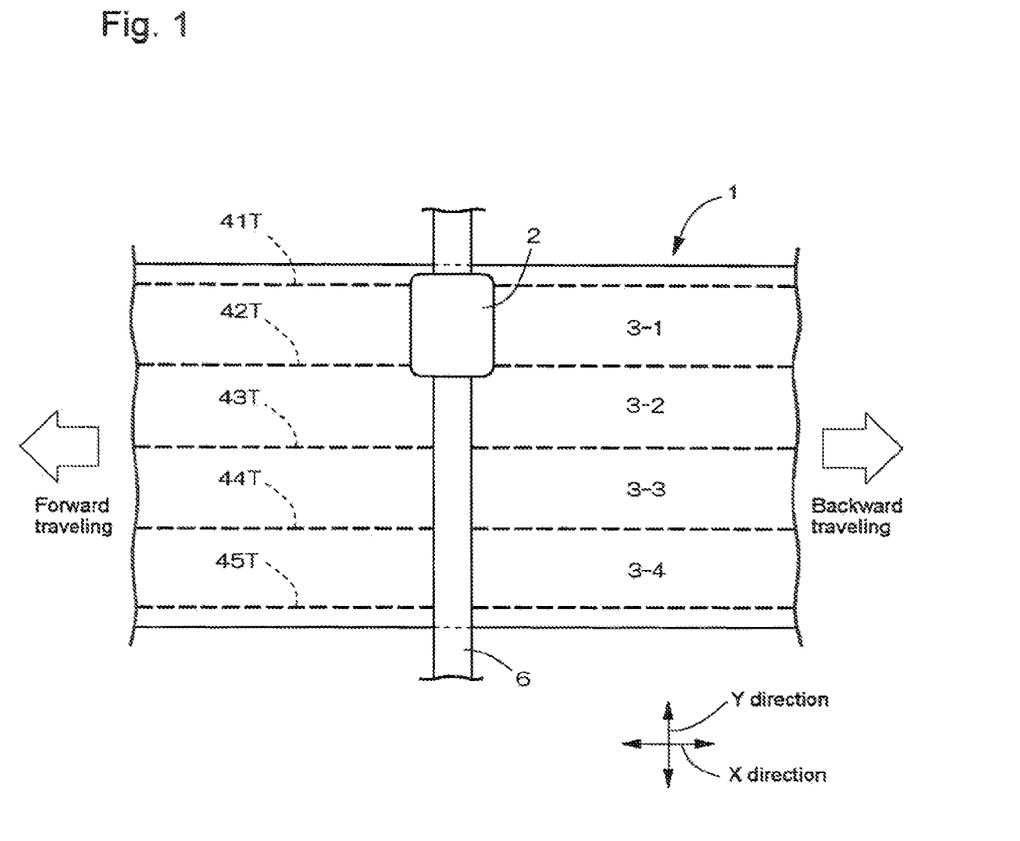
FIG. 1 is a view showing one example of a relationship between a magnetic tape and a head unit in a recording/reproducing method of a magnetic tape according to the present invention.
Figure 4:
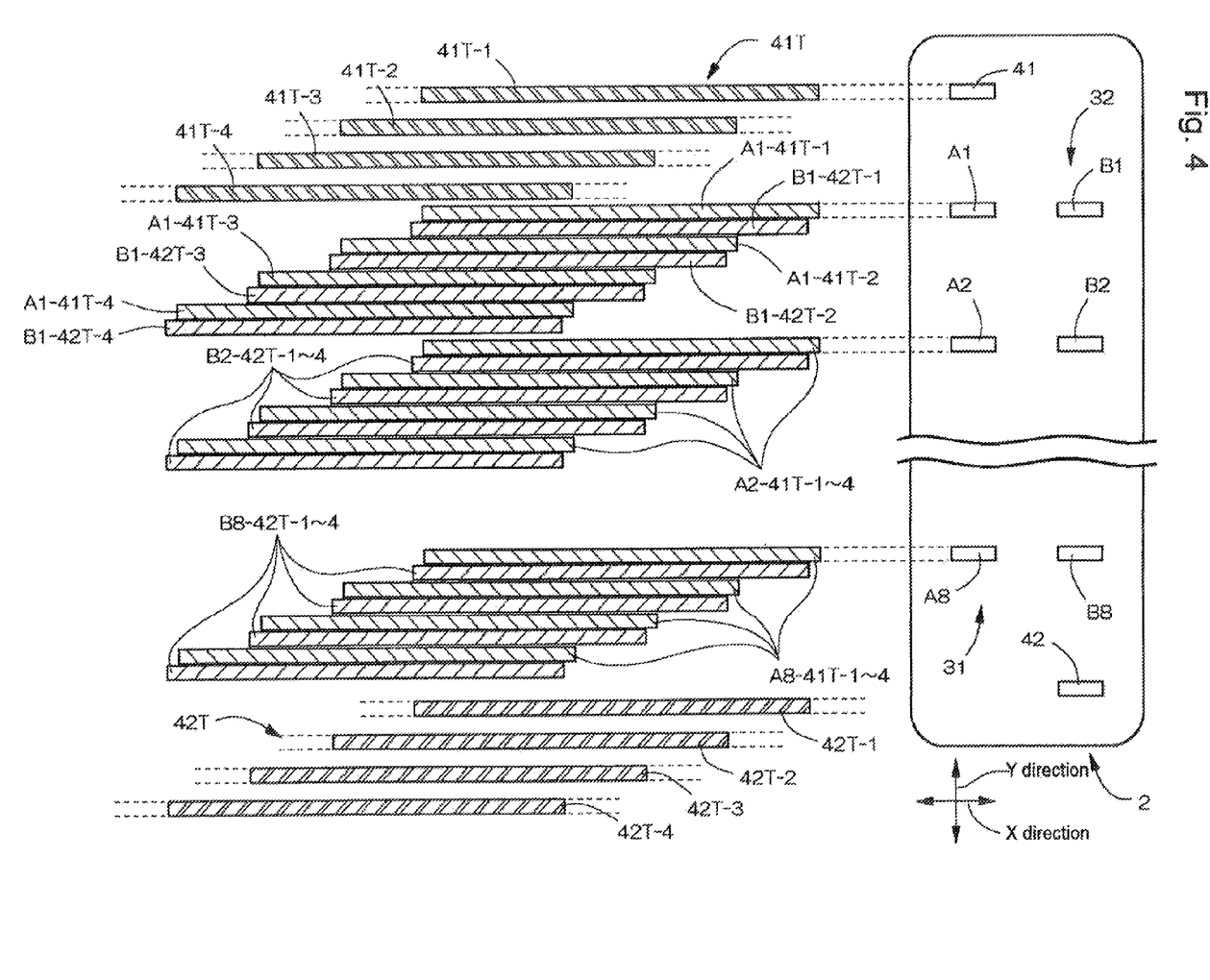
FIG. 4 is a view showing a conventional recording/reproducing method of a magnetic tape.

One example of recording/reproducing methods of a magnetic tape in the tracking servo system is more specifically described using FIG. 4. A head unit 2 used in this example comprises two head groups; a head group 31 consisting of eight data heads (A1 to A8) which form data tracks (A1-41T-1 etc.) in data track regions (3-1 etc.: FIG. 1 according to the present invention) of a magnetic tape 1 (FIG. 1) when the magnetic tape 1 travels forwardly from the beginning side to the end side; and a head group 32 consisting of eight data heads (B1 to B8) which form data tracks (B1-42T-1 etc.) when the magnetic tape 1 travels backwardly from the end side to the beginning side. At the respective end parts of the head groups 31 and 32 in the width direction (Y direction) of the magnetic tape 1, servo heads 41 and 42 are provided for tracing the servo tracks (41T-1 to 41T-4, 42T-1 to 42T-4 etc.) previously formed on the magnetic tape 1.

In each of the data heads (A1 to A8, B1 to B8) built are a recoding head for writing a data signal to form a data track and a reproducing head for reading the data signal from the data track. In a typical configuration, the track width size of the recording head is set larger than that of the reproducing head. In other words, the track width of the reproducing head is set smaller than the track width of the data track (A1-41T-1 etc.) to be formed with the recording head. Therefore, if relative positions between the data tracks and the reproducing heads fall within this margin in the reproduction, the operation of reading data from the data tracks can be performed without trouble.

Using the head unit 2 as thus described, first, a servo track (41T-1) is traced with the servo head 41 and, while performing tracking servo, data tracks are written with the data heads (A1 to A8) on the forward traveling magnetic tape 1. In the illustrated example, data tracks formed in such a writing/recording operation are denoted as (A1-41T-1) to (A8-41T-1).

When the magnetic tape 1 reaches the end, a switch is made to the data heads (B1 to B8). The servo track 41T is then traced with the servo head 42 and, while performing tracking servo, data tracks (B1-42T-1) to (B8-42T-1) are written. In Forming the data tracks (B1-42T-1) to (B8-42T-1), the head unit 2 is shifted in the width direction (Y direction) of the magnetic tape 1 so as to prevent these data tracks (B1-42T-1) to (B8-42T-1) from overlapping the data tracks (A1-41T-1) to (A8-41T-1) formed in the previous forward traveling. When the magnetic tape 1 reaches the beginning, a switch is made back to the data heads (A1 to A8). The head unit 2 is then shifted to trace the servo track (41T-2) with the servo head 42 and, while performing tracking servo, the data tracks (A1-41T-2) to (A8-41T-2) are formed. Further, when the magnetic tape 1 reaches the end, a switch is made to the data heads (B1 to B8). The head unit 2 is then shifted to trace the servo track (42T-2) with the servo head 42 and, while performing tracking servo, the data tracks (B1-42T-2) to (B8-42T-2) are formed. In the present example, writing in a data track region (3-1) is completed by repetition of the operation as thus described four times, and thereafter, the head unit 2 is greatly moved to a succeeding data track region (3-2), and forms data tracks in this data track region (3-2).

The reproducing operation is performed in a procedure inverse to the procedure of the previously performed recoding operation. Namely, the servo tracks (41T-1 etc.) are traced and, while performing tracking servo, the data heads (A1 to A8, B1 to B8) are aligned to face the corresponding data tracks. Thereafter, data signals written in the data tracks are read with the reproducing heads in the data heads (A1 to A8, B1 to B8).

In the conventional figuration as thus described, all the data heads (A1 to A8, B1 to B8) are set to have the same size in the width direction (Y direction) of the magnetic tape 1, and hence all the track width of the data tracks are set to have the same width. The smaller the track width of each of the data tracks, the larger the number of data tracks on a magnetic tape can be. This is an advantage in increasing the recording capacity of the magnetic tape. In the meantime, however, a difference may occur in expansion coefficient between the magnetic tape 1 and the head unit 2 due to a change in tracking servo accuracy or a change in external environment such as a temperature or moisture, thereby making the sizes of the magnetic tape 1 and the head unit 2 different, or the width of the magnetic tape 1 may change caused by leaving the tape unused after taken up. In view of these problems and the like, the lower limit value of the data track width is determined by itself. If the track width of each of the data tracks is as small as below this lower limit value, the data heads are move likely to be displaced from the data tracks to cause unstable data reading, thereby increasing an error rate.

Among the foregoing problems that cause the displacement of the relative position between the data track and the data head, the vibration of the tape in the width direction in the traveling can be dealt with by improvement in tracking servo performance, whereas the other problems, like the problem of the size difference between the head unit and the magnetic tape caused by the difference in expansion coefficient therebetween due to a temperature or moisture change and the problem of the change in tape width caused by leaving the tape unused after taken up, cannot be dealt with by improvement in tracking servo performance. Namely, the reproduction accuracy may be lowered, as displacement, which occurs due to an external environmental change or the like, between the distance from the servo head 41 or 42 on the head unit 2 to the data head (A8, B1) located most distant from the servo head 41 or 42 and the corresponding distance from the servo tracks (41T-1 to 41T-4, 42T-1 to 42T-4) to the data tracks (A8-41T-1 to A8-41T-4, B1-42T-1 to B1-42T-4) becomes not ignorable relative to the foregoing margin.

A specific example is described below. When the distance from the servo head 41 or 42 to the data head A8 to B1 located most distant from the servo head 41 or 42 is 250 μm, and the respective track widths of the recording head and the reproducing head in the data head A8 or B1 are 20 μm and 12 μm, a displacement margin of one of the reproducing head is as small as 4 μm. Since the expansion change of the head unit 2 and that of the magnetic tape 1 in the width direction due to a temperature or moisture change depend largely upon a moisture difference, a moisture expansion coefficient is used in the following consideration. In the case where the magnetic tape 1 has a moisture expansion coefficient of $2\times10^{-5}$/%RH, when the moisture changes by 40%RH from the time of recording to the time of reproduction, a displacement of 2.0 μm at the maximum occurs in the figuration shown FIG. 4 described above. Therefore, in the data track located closest to the servo track, the vibration of the magnetic tape 1 in the width direction in the traveling causes no problem up to a vibration amplitude of about 8 μm, whereas in the data track located most distant from the servo track, an allowable vibration amplitude range is as small as 4 μm, and thereby reading of data from this track tends to be unstable. This may become a big, inevitable problem in an attempt to increase the recording density of the data tracks for the purpose of further increasing the capacity of the magnetic tape.

Such a problem can be solved by individual control of fine movements of the recording head and the reproducing head in each of the magnetic heads based upon servo signal for fine movement written in each of the data tracks on the magnetic tape, as described in above-mentioned Japanese Laid-Open Patent Publication No. 2003-173508. However, in the method according to this document, since the servo signals for fine movement are written in the data tracks on the magnetic tape, it is impossible to avoid reduction in data recording area by the region of the servo signals for fine movement, thereby inhibiting the increase in recording density. Especially, this method has a disadvantage in that the configuration of the magnetic tape and the head unit are complex, and hence the control thereof also becomes complex.

An object of the present invention is surely preventing, with a simple configuration, occurrence of a recording/reproducing error caused by a size change of a magnetic tape in width direction, in a recording/reproducing method of a magnetic tape in a tracking servo system. Another object of the present invention is increasing the number of data tracks formed by writing on the magnetic tape to increase the recording density of the data tracks so as to obtain a magnetic tape with high capacity.

Figure 2:
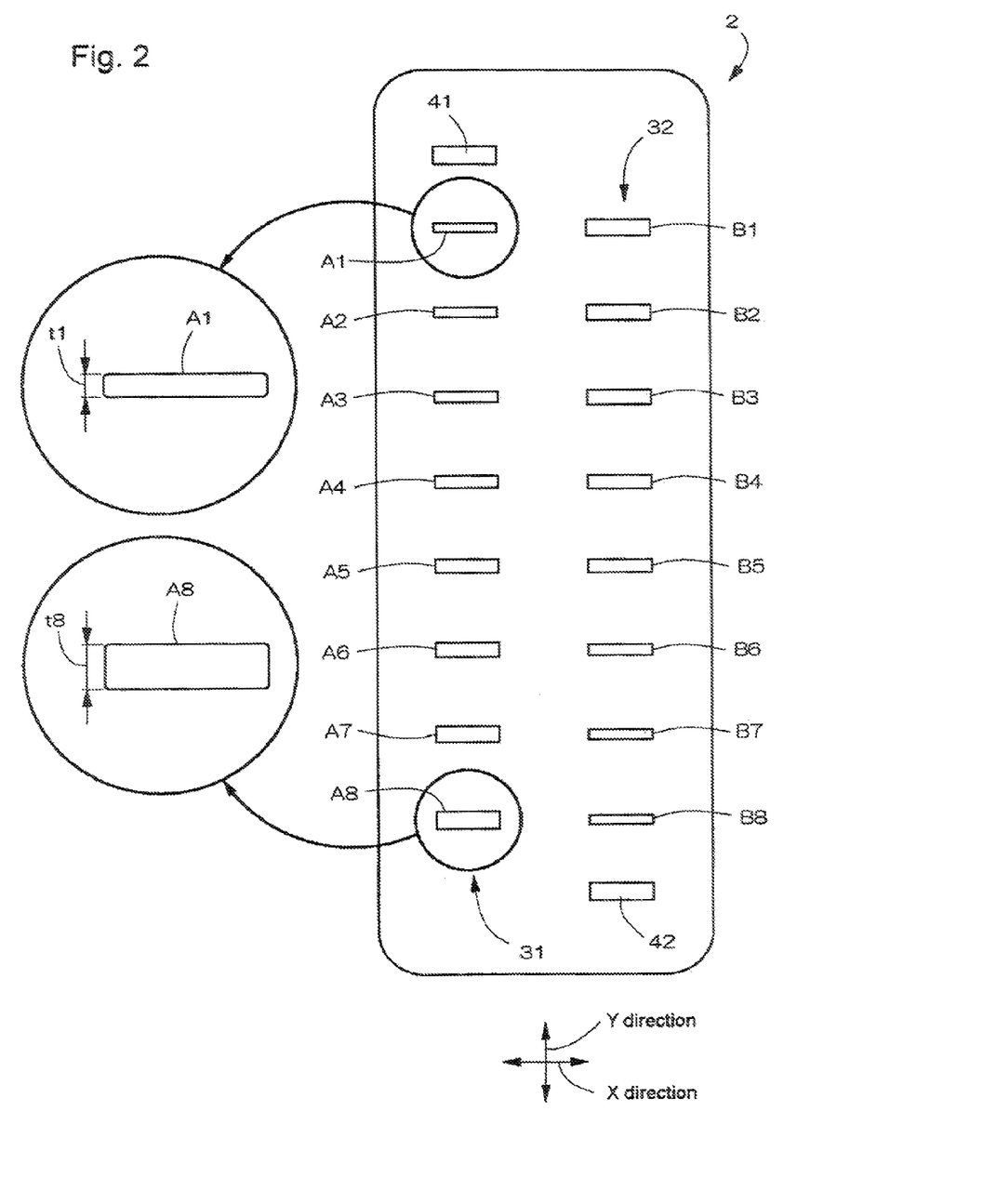
FIG. 2 is a plan view showing one example of a multi-channel type head unit.
Figure 3:
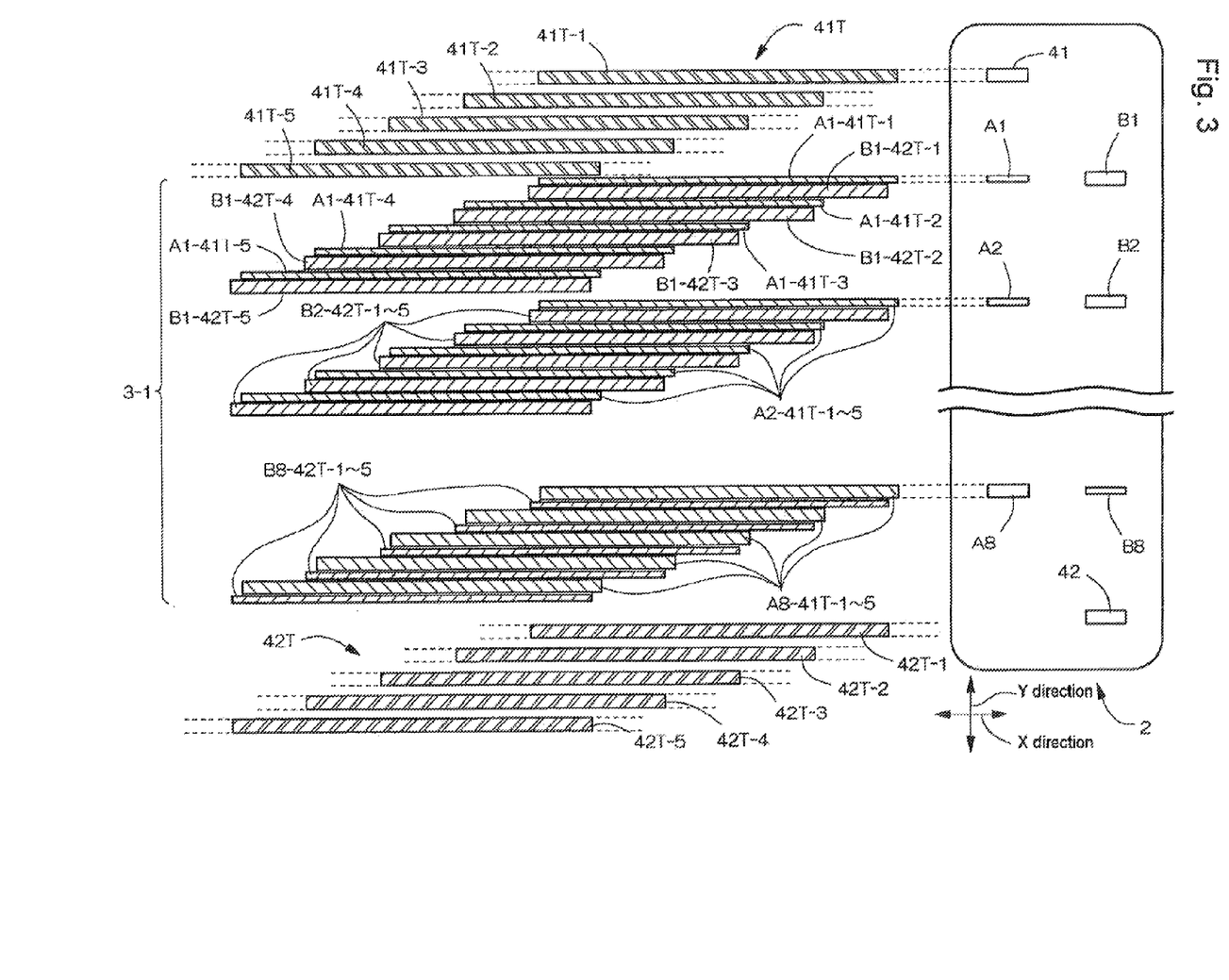
FIG. 3 is a view for explaining relationships between the head unit and data tracks to be written on the magnetic tape.

As shown in FIGS. 1 to 3, the present invention is a recording/reproducing method of a magnetic tape 1, using a multi-channel type head unit 2 comprising: a plurality of data heads (A1 to A8, B1 to B8) for recording/reproduction which form data tracks (A1-41T-1 etc.) on the magnetic tape 1 and read data signals from the data tracks; and servo heads (41, 42) for tracing servo tracks (41T-1 to 41T-5, 42T-1 to 42T-5, etc.) previously provided on the magnetic tape l, the method comprising: a recording process for forming a plurality of data tracks (A1-41T-1 etc.) on the magnetic tape 1 with the data heads (A1 to A8, B1 to B8) while tracing the servo tracks (41T-1 to 41T-5, 42T-1 to 42T-5, etc.) on the magnetic tape 1 with the servo heads (41, 42); and a reproducing process for tracing the servo tracks (41T-1 to 41T-t5, 42T-1 to 42T-5, etc.) to read data signals recorded in the data tracks (A1-41T-1 etc,) while aligning the data heads (A1 to A8, B1 to B8) to face the data tracks (A1-41T-1 etc.)

The recording/reproducing method of a magnetic tape of the present invention is characterized in that the plurality of data tracks (A1-41T-1 to A8-41-1 etc.) formed in the recording process are each set to have a smaller track width stepwise as located closer to the servo tracks (41T-1 to 41T-5 etc.) in the width direction (Y direction) of the magnetic tape 1.

Namely, when taking a look at data tracks formed based upon the servo track (41T-1) the data track (A8-41T-1) located most distant from the servo track (41T-1) is set to have the largest track width. The other data tracks are each set to have a smaller track width stepwise as located closer to the servo track (41T-1) in the width direction (Y direction) of the magnetic tape 1. The data track (A1-41T-1) located closest to the servo track (41T-1) is set to have the smallest track width. The term "stepwise" in the present invention represents a concept including a figuration in which data tracks having the same track width are aligned in one location or a plurality of locations, that is, three or more data tracks are aligned and the data track located closest to the servo track has the smallest track width while the data track located most distant from the servo track has the largest track width, and the data track located between those two data tracks has a width of an intermediate value between the largest and the smallest widths. The concept may also include a figuration in which, for example, the data tracks (A1-41T-1) and (A2-41T-1) are set to have the same track width while the data track (A3-41T-1) and the other data tracks are each set to have a larger track width as located more distant from the servo track.

More specifically, servo track regions (41T to 45T), each comprising a plurality of servo tracks (41T-1 etc.) traveling in the longitudinal direction of the magnetic tape 1, are formed at prescribed intervals in the width direction of the magnetic tape 1. Regions sectioned with the servo track regions (41T to 45T) in the width direction of the magnetic tape 1 serve as data track regions (3-1 to 3-4) in which the data tracks (A1-41T-1 etc.) are formed. In the recording process, a recording operation is performed in the data track regions (3-1 to 3-4), not only in forward traveling of the magnetic tape 1, but in backward traveling of the magnetic tape 1 in the reverse direction to the forward traveling. In the data track regions (3-1 to 3-4), data tracks (A1-41T-1 etc.) are formed so as to be alternately laminated in the width direction of the magnetic tape 1 in the forward/backward traveling.

In the forward traveling, the recording operation is performed using servo tracks (e.g. 41T-1 to 41T-5) in the servo track region (e.g. 41T) located on one end side of the data track regions (3-1 to 3-4) in the width direction of the magnetic tape 1, whereas in the backward traveling, the recording operation is performed using servo tracks (e.g. 42T-1 to 42T-5) in the servo track region (e.g. 42T) located on the other end side of the data track regions (3-1 to 3-4) in the width direction of the magnetic tape 1. Further, the plurality of data tracks (A1-41T-1 etc.) formed in the forward/backward traveling can each be set to have a smaller track width stepwise as located closer to the servo tracks (41T-1 to 41T-5, 42T-1 to 42T-5) in the width direction (Y direction) of the magnetic tape 1.

In the recording/reproducing method of a magnetic tape according to the present invention, the data tracks are each set to have a smaller track width stepwise as located closer to the servo tracks in the width direction (Y direction) of the magnetic tape 1, i.e. the data tracks are each set to have a larger track width stepwise as located more distant from the servo track in the width direction (Y direction) of the magnetic tape 1. With this setting, the size of the magnetic tape 1 changes in the width direction due to a change in external environment such as a temperature or moisture. As a result, for example, even if the data tracks (A8-41T-1 to A8-41T-5) located distant from the servo tracks (41T-1 to 41T-5) are greatly displaced, the data head (A8) can be readily aligned to face the data tracks (A8-41T-1 to A8-41T-5) by an increased portion of the track width size thereof. It is therefore possible to ensure reading of data signals from the data tracks (A8-41T-1 to A8-41T-5) so as to improve reproduction accuracy. Further, the method according to the present invention has an advantage of simplicity of the whole configuration and easiness of control as compared with the figuration for writing servo signals for fine movement as described in Japanese Laid-Open Patent Publication No. 2003-173508.

Additionally, since the track width of the data track closest to the servo track can be minimized, it is possible to significantly increase the number of the data tracks to increase the recording density of the data tracks, so as to contribute to an increase in capacity of the magnetic tape. In other words, for example, since the data tracks (A1-41T-1 to A1-41T-5) adjacent to the servo tracks (41T-1 to 41T-5) are hardly affected by a size change of the magnetic tape 1 in the width direction (Y direction) due to an external environmental change, the track width of the data tracks (A1-41T-1 to A1-41T-5) can be minimized without impairing accuracy of reading of data signals from the data tracks (A1-41T-1 to A1-41T-5). Moreover, the track widths of the data tracks (A2-41T-1 to A2-41T-5 etc.) other than the data tracks (A1-41T-1 to A1-41T-5), which are closer to rather than distant from the servo tracks, can be made as small as possible in the range where the data tracks (A2-41T-1 to A2-41T-5 etc.)are not affected by the size change of the magnetic tape 1 in the width direction. As thus described, according to the present invention, it is possible to significantly, increase the number of the data tracks so as to increase the recording density of the data tracks.

With the recording operation arranged to be performed in the data track regions (3-1 to 3-4) not only in forward traveling of the magnetic tape 1 but in backward traveling of the magnetic tape 1 in the reverse direction to the forward traveling, it is possible to increase the recording density of the data tracks. Further, if the plurality of data tracks (A1-41T-1 etc.) formed in the forward/backward traveling are each set to have a larger track width stepwise as located distant from the servo tracks (41T, 42T), which were used for forming the data tracks (A1-41T-1 etc.), in the width direction of the magnetic tape 1, the influence of the size change of the magnetic tape 1 in the width direction, which occurred due to a change in external environment such as a temperature or moisture, can be reduced and it is thereby possible to ensure reading of data signals from the data tracks (A8-41T-1 to A8-41T-5, B1-42T-1 to B1-42T-5) so as to improve the reproduction accuracy.

DETAILED DESCRIPTION OF THE PREFERRED EMBODIMENTS

FIGS. 1 to 3 show one of embodiments of the recording/reproducing method of a magnetic tape according to the present invention. It is to be noted that the tracking servo system is classified into a magnetic servo system (system where a servo signal is formed on a magnetic layer by magnetic recording, which is magnetically read to perform servo tracking) and an optical servo system (system where a servo signal consisting of an array of recessed portions is formed on a back layer by laser irradiation or the like, which is optically read to perform servo tracking). While the idea of the present invention is applicable to either of the two servo systems, in the present embodiment, the former, magnetic servo system is described as an example.

In FIG. 1, reference numeral 1 denotes a magnetic tape, and reference numeral 2 denotes a head unit built in a tape drive. The head unit 2 can be freely shifted and moved in the width direction of the magnetic tape 1 by an actuator not shown in the figure, along an arm 6 extending across the width direction. The magnetic tape 1 is traveled and moved by means of a driving mechanism of the tape drive in a forward traveling direction and in a backward traveling direction. The forward traveling direction, indicated in the figure with a leftward arrow, is a direction in which the tape travels from the beginning to the end. The backward traveling direction, indicated in the figure with a rightward arrows, is a direction in which the tape travels from the end to the beginning. It should be noted in the following description, the forward/backward traveling direction of the magnetic tape 1 is appropriately referred to as an X direction and the width direction of the magnetic tape 1 as a Y direction.

The head unit 2 is a multi-channel type head having a large number of data heads. As shown in FIG. 2, the head unit 2 comprises, on the surface the magnetic tape 1, two servo heads 41 and 42, and the data head groups 31 and 32 extending in two lines in the width direction (Y direction) of the magnetic tape 1. The data head groups 31 and 32 each consist of eight data heads (A1 to A8, B1 to B8) disposed at equal intervals in the Y direction. Each of the data heads (A1 to A8, B1 to B8) comprises: a recording head which performs a writing operation on the magnetic tape 1 to form data tracks (A1-41T-1 etc.: cf. FIG. 3); and a reproducing head which reads data from the data tracks (A1-41T-1 etc.). The data head group 31 serves to perform recording/reproducing operations in the forward traveling of the magnetic tape 1. The data head group 32 serves to perform recording/reproducing operations in the backward traveling of the magnetic tape 1. It is to be noted that, in each of those data heads A1 to A8, B1 to B8), the width size (track width) of the reproducing head in the Y direction is set smaller than that of the recording head.

At the respective end parts of the data head groups 31 and 32 in the width direction (Y direction) of the magnetic tape 1, the servo heads 41 and 42 are disposed. Namely, at the end part of the head group 31 for writing in the Y direction in the forward traveling, the servo head 41 is disposed for reading positional signals of the servo tracks (41T-1 etc.: FIG. 3) and tracing the servo tracks (41T-1 etc.) in the forward traveling. Meanwhile, at the end part of the other head group 32 in the Y direction, the servo head 42 is provided for reading the servo tracks (42T-1 etc.) in the backward traveling.

The magnetic tape 1 is a tape adapted to the recording/reproducing method in the tracking servo system. As shown in FIGS. 1 and 3, five servo track regions (41T to 45T) are juxtaposed at prescribed intervals in the width direction (Y direction) of the magnetic tape 1. Each of the servo track regions (41T to 45T) consists of five servo tracks (41T-1 to 41T-5, 42T-5 etc.) traveling in the longitudinal direction over the effective length of the magnetic tape 1. The surface region of the magnetic tape 1 is sectioned in the width direction with the servo track regions (41T to 45T) into four data track regions (3-1 to 3-4). As shown in FIG. 3, in such data track regions (3-1 to 3-4), a large number of data tracks (A1-41T-1 to A1-41T-5: cf. FIG. 3) are formed in an after-mentioned recording operation performed by the head unit 2. It should be noted that, although FIG. 3 shows the servo tracks (41T-1 to 41T-5 etc.) and the data tracks (A1-41T-1 to A1-41T-5 etc.) displaced in the horizontal direction, this is just for the sake of simplicity in explanation. In practice, those tracks are formed over the longitudinal direction of the magnetic tape 1.

The head unit 2 as thus configured performs a recording operation in the way of filling the spaces among the data heads (A1 to A8, B1 to B8), by being shifted by a prescribed width in every one-way traveling in such a degree that the data tracks are not overlapped with one another in the width direction (Y direction). More specific description is given below. First, the servo track (41T-1) is traced with the servo head 41 on the magnetic tape 1 traveling in the forward direction from the beginning to the end and, while performing tracking servo, eight data tracks (A1-41T-1, A2-41T-1 to A8-41T-1) are written and formed with the recording heads built in the data heads (A1 to A8), constituting the head group 31 for forward traveling recording/reproduction, in the data track region (3-1) of the magnetic tape 1.

Next, when the magnetic tape 1 reaches the end by means of the driving mechanism on the tape drive side, a switch is made to the data heads (B1 to B8) constituting the head group 32 for backward traveling. The servo track (42T-1) is traced with the servo head 42 for backward traveling and, while performing tracking servo, eight data tracks (B1-42T-1, B2-42T-1 to B8-42T-1) are written with the data heads (B1 to B8). The head unit 2 is shifted in the width direction (Y direction) of the magnetic tape 1 to write the data tracks (B1-42T-1 to B8-42T-1) in such a degree that these data tracks (B1-42T-1 to B8-42T-1) do not overlap the data tracks (A1-41T-1 to A8-41T-1) formed in the previous forward traveling. When the magnetic tape 1 reaches the beginning; a switch is made back to the data heads (A1 to A8) constituting the head group 31 for the forward traveling. The head unit 2 is then shifted in the Y direction to trace the servo track (41T-2) with the servo head 41 for the forward traveling and, while performing tracking servo, the data tracks (A1-41T-2, A2-41T-2 to A8-41T-2) are written with the data heads (A1 to A8). When the magnetic tape 1 reaches the end, a switch is made back to the data heads (B1 to B8) for the backward traveling. The head unit 2 is then shifted in the Y direction to trace the servo track (42T-2) with the servo head 42 and, while performing tracking servo, the data tracks (B1-41T-2, B2-41T-2 to B8-41T-2) are written with the data heads (B1 to B8).

With writing of the data tracks (A1-41T-1 to B8-42T-5) completed after repetition of the above operation, writing in the data track region (3-1) is completed. The head unit 2 is then moved greatly onto a succeeding data track region (3-2), and performs the writing operation in this data track region (3-2). When performing the writing operation in the data track region (3-2), in the forward traveling, the servo tracks (42T-1 to 42T-5) formed in the servo track region (42T) are traced with the servo head 41 to perform tracking servo, and in the backward traveling, the servo tracks formed in the track region (43T) are traced with the servo head 42 to perform tracking servo. The writing operations are performed in the succeeding data track regions (3-3, 3-4) in exactly the same manner as in the previous data track regions. Accordingly, it is possible in the present embodiment to form a total of 320 data tracks in the width direction (Y direction) of the magnetic tape 1.

The reproducing operation can be performed in a procedure inverse to the procedure in the previously performed recoding operation. Namely, the servo tracks (41T-1 etc.) formed in the servo track regions (41T to 45T) are traced to perform tracking servo, and the data heads (A1 to A8, B1 to B8) are aligned to face the corresponding data tracks. Therefore, data signals written in the data tracks are read with the reproducing heads in the data heads (A1 to A8, B1 to B8).

As thus described, when the recording/reproducing operations are performed with the tracking servo system on the high recording density type magnetic tape 1 where a large number of data tracks are formed, a size change of the magnetic tape 1 in the width direction (Y direction), due to a change in external environment such as a temperature or moisture, may appear as a large problem. That is, when the size of the magnetic tape 1 changes in the width direction (Y direction) under the influence of the external environmental change, the width sizes of the servo tracks and data tracks become larger/smaller, which might prevent accurate performance of the recording/reproducing operations.

The influence of such a size change is particularly conspicuous in the data tracks located distant from the servo tracks. Since the size change of the head unit 2 is hardly affected by an external environment, a change in distance from the servo head 41 to 42 to each of the data heads (A1 to A8, B1 to B8) is considerably small as compared with the case of the magnetic tape 1 even under the influence of the external environment. On the other hand, when the size of the magnetic tape 1 changes in the width direction (Y direction), a change in distance from the servo track to each of the data tracks is larger as the data track is more distant from the servo track. Therefore, while the data tracks (e.g. A1-41T-1) located close to the servo track can be accurately read, the data heads (e.g. A8) cannot be accurately aligned to face the corresponding data tracks (e.g. A8-41T-1) located distant from the servo track, and hence reading of data signals from the data tracks located distant from the servo track becomes unstable, thereby tending to increased an error rate.

In the present embodiment, as shown in FIG. 3, the data tracks are each set to have smaller track width stepwise as located closer to the servo tracks in the width direction (Y direction) of the magnetic tape 1. With this configuration, even when the size of the magnetic tape 1 changes in the width direction due to an external environmental change to result in large displacement of, for example, the data tracks (A8-41T-1 to A8-41T-5) located distant from the servo tracks (41T-1 to 41T-5), the reproducing head (A8) can be readily aligned to the data tracks (A8-41T-1 to A8-41T-5) by setting the width of the data track most distant from the servo track such that the positional relationships between the data tracks (A1-41T-1 to A1-41T-5) and the reproducing head (A8) fall within an allowable range, and it is thereby possible to ensure reading of data signals from the data tracks (A8-41T-1 to A8-41T-50 so as to improve reproduction accuracy.

In order to obtain the action effect as thus described, as shown in FIG. 2, the data heads (A1 to A8, B1 to B8) constituting the data head group 31 to 32 are each set to have a smaller width size (t1 to t8) stepwise as located closer to the servo head 41 to 42 in the width direction (Y direction) of the magnetic tape 1. Therefore, as shown in FIG. 3, the data tracks (e.g. A1-41T-1 to A1-41T-5 etc.) formed on the magnetic tape 1 can each be set to have a smaller track width stepwise as located closer to the corresponding servo tracks (e.g. 41T-1 to 41T-5 etc.) in the width direction (Y direction) of the magnetic tape 1.

As described above, since each of the respective reproducing heads constituting the data heads (A1 to A8, B1 to B8) is set to have a smaller width size in the width direction (Y direction) of the magnetic tape 1 than the width size of the corresponding recording head, even when the data tracks such as (A8-41T-1 to A8-41T-5) are displaced in the width direction (Y direction) of the magnetic tape 1, the reproducing head can be readily aligned to face the data tracks (A8-41T-1 to A8-41T-5) by a portion of a difference in width size between the recording head and the reproducing head in the width direction (Y direction), and it is thereby possible to favorably secure the reproduction accuracy. It should be noted that the term "width size" of the recording head or the reproducing head here means an effective width of the head to contribute to writing or reading of data.

Additionally, in the figuration of the data tracks on the magnetic tape 1 according to the present embodiment, the track width of the data track closest to the serve track can be minimized. Specifically, for example, the data tracks (A1-41T-1 to A1-41T-5) adjacent to the servo tracks (41T-1 to 41T-5) are hardly affected by a width size change of the magnetic tape 1 (Y direction) due to an external environmental change, and hence the track width of the data tracks (A1-41T-1 to A1-41T-5) can be minimized without impairing accuracy of reading data signals from the data tracks (A1-41T-1 to A1-41T-5). Moreover, the track widths of the data tracks (A2-41T-1 to A2-41T-5 etc.) other than the data tracks (A1-41T-1 to A1-41T-5), which are close to rather than distant from the servo tracks, can be made as small as possible in the range where the data tracks (A2-41T-1 to A2-41T-5 etc.) are not affected by the size change of the magnetic tape 1 in the width direction. With the width sizes of the data tracks having made smaller as thus described, it is possible to significantly increase the number of the data tracks to increase the recording density of the data tracks, thereby largely contributing to an increase in capacity of the magnetic tape. A specific example is described as follows. In FIG. 4 illustrating the conventional figuration, the number of data tracks written in one data track region is four, whereas in the present embodiment, the number of data tracks that can be written in one data track region is five, which leads to an increase in recording capacity by 25%.

Figure 5:
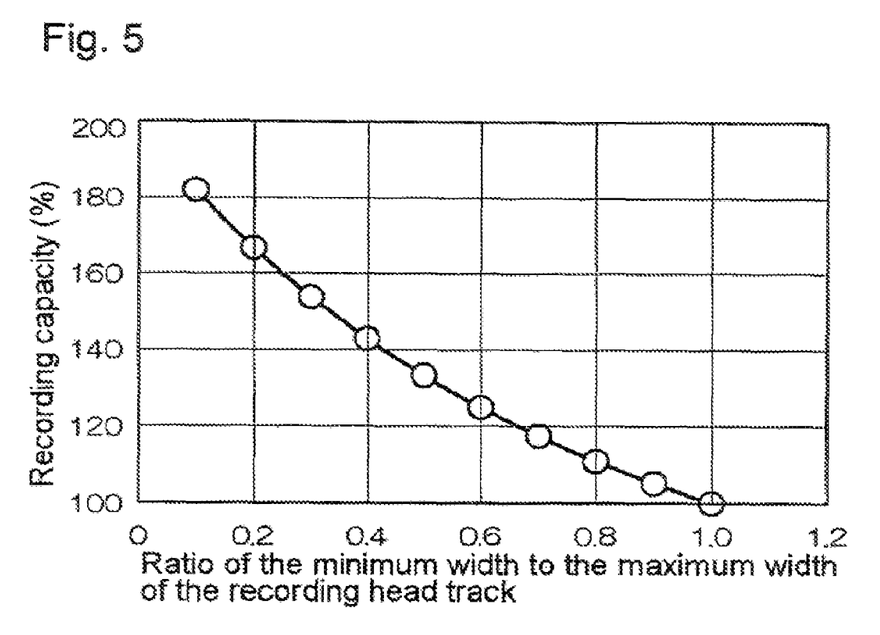
FIG. 5 is a view showing a relationship between an increase in recording capacity and a value obtained by the minimum recording head track width/the maximum recording head track width, in the recording/producing method of a magnetic tape according to the present invention.

According to the findings by the present inventor, a pitch (amount of the head unit shifted in either forward or backward traveling) between the data tracks can be approximately set to a value obtained by: (the maximum recording head track width+the minimum recording head track width)×½. It is thus possible to form a larger number of data tracks as compared with the recording/reproducing figuration of a magnetic tape as shown in FIG. 4 as the conventional example, so as to increase the recording density. FIG. 5 shows a relationship between a capacity increase and a value obtained by: the minimum recording head track width/the maximum recording head track width. It is to be noted that in FIG. 5, the recording/reproducing figuration (the minimum width/the maximum width=1) in FIG. 4 as the conventional example is considered as 100%. It is found from FIG. 5 that, when the value obtained by: the minimum width/the maximum width, is set to 0.5, the recording capacity can be increased to 130%.

The maximum data track width and the minimum data track width are determined by specifications of a driving system, e.g. a distance from a servo head to a data head located most distant from the servo head, data head mounting accuracy, a tension for taking up a magnetic tape, tracking servo accuracy and use environmental conditions. In the conventional recording method of a magnetic tape, there has been no other choice but to design a data track width as the hereintermed maximum data track width. As opposed to this, according to the present invention, it is possible to set the data track width without restriction by the above conditions, so as to surely obtain a system with a larger recording capacity than in the conventional figuration.

The reproducing head is usually designed to have a smaller width than the width of the recording track. In the present invention, while the width of the reproducing head corresponding to the width of the recording head may be designed in the above-mentioned manner, it is preferable to combine the reproducing head, having a smaller track width than the minimum recording head track width, with every recording head so as to allow lower cost.

What is claimed is:

1. A magnetic tape comprising a plurality of data tracks and servo tracks and used for a multi-channel type head unit,
   wherein the data tracks are formed as data track groups by said multi-channel type head unit in regions sectioned with the servo tracks in the width direction of the magnetic tape, and each data track group formed respectively with one of said plurality of servo tracks, and
   wherein each data track group comprises more than three data track sub-groups comprising a plurality of data tracks having the same track width, respectively, and aligned in the width direction of the magnetic tape, with data tracks of a first data track sub-group located closest to a respective one of said plurality of said servo tracks having the smallest width size, while data tracks of a second data track sub-group located most distant from the respective one of said plurality of said servo tracks having a largest width size, and data tracks of more than one data track sub-group located between the first and second two data track sub-groups having a width of intermediate value between said largest and smallest widths.

2. The magnetic tape according to claim 1,
   wherein data tracks having the same track width are aligned in one location or a plurality of locations.

* * * * *